United States Patent
Smiley et al.

(10) Patent No.: US 9,286,125 B2
(45) Date of Patent: Mar. 15, 2016

(54) PROCESSING ENGINE IMPLEMENTING JOB ARBITRATION WITH ORDERING STATUS

(71) Applicants: David A. Smiley, Chandler, AZ (US); Naveen Lakkakula, Chandler, AZ (US); Weiqiang Ma, Chandler, AZ (US); Justin B. Diether, Phoenix, AZ (US); Nitin N. Garegrat, Chandler, AZ (US)

(72) Inventors: David A. Smiley, Chandler, AZ (US); Naveen Lakkakula, Chandler, AZ (US); Weiqiang Ma, Chandler, AZ (US); Justin B. Diether, Phoenix, AZ (US); Nitin N. Garegrat, Chandler, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 360 days.

(21) Appl. No.: 13/829,118

(22) Filed: Mar. 14, 2013

(65) Prior Publication Data
US 2014/0282579 A1 Sep. 18, 2014

(51) Int. Cl.
*G06F 9/50* (2006.01)

(52) U.S. Cl.
CPC ........ *G06F 9/5027* (2013.01); *G06F 2209/503* (2013.01)

(58) Field of Classification Search
None
See application file for complete search history.

(56) References Cited

U.S. PATENT DOCUMENTS

| | | | |
|---|---|---|---|
| 6,952,825 B1 * | 10/2005 | Cockx et al. | 718/102 |
| 8,826,280 B1 * | 9/2014 | Robertson et al. | 718/100 |
| 2011/0078696 A1 * | 3/2011 | Blackburn et al. | 718/104 |
| 2013/0047164 A1 * | 2/2013 | Ujibashi | 718/104 |

* cited by examiner

*Primary Examiner* — Umut Onat
(74) *Attorney, Agent, or Firm* — Lowenstein Sandler LLP

(57) ABSTRACT

A processing engine implementing job arbitration with ordering status is disclosed. A method of the disclosure includes receiving, by a job assigner communicably coupled to a plurality of processors, availability status from a plurality of job rings, availability status from the plurality of processors, and job entry completion status from an order manager, identifying, based on the received job entry completion status, a set of job rings from the plurality of job rings that do not exceed threshold conditions maintained by the job assigner, selecting, from the identified set of job rings, a job ring from which to pull a job entry for assignment, wherein the selecting is based on the received availability status of the plurality of job rings, and selecting, based on the received availability status of the plurality of processors, a processor to receive the assignment of the job entry for processing.

26 Claims, 6 Drawing Sheets

PROCESSING ENGINE IMPLEMENTING JOB ARBITRATION WITH ORDERING STATUS

TECHNICAL FIELD

The embodiments of the disclosure relate generally to processing devices and, more specifically, relate to a processing engine implementing job arbitration with ordering status.

BACKGROUND

Communications protocol processing, such as for encryption, compression, or datapath processing typically involves a high-level multi-threaded computational engine issuing jobs having communication processing tasks to lower-level processors. These lower-level processors utilize a common set of specialized coprocessors that process the communications data. Each processing thread provides a unique set of tasks that are to be processed, and processing each of the tasks may utilize a subset of the specialized coprocessors.

Because there are typically not enough lower-level processors and coprocessors to perfectly match the number of tasks to perform, these resources (i.e., processors and coprocessors) should be fairly allocated so that the high-level multi-threaded computational engine can finish its tasks. The typical solution to this fair allocation of resources is to use a dedicated processor thread to manage these resources. The dedicated processor thread allocates a new thread's job when a number of jobs in an incoming queue falls below a threshold value. This traditional solution utilizes an expensive higher-level thread and also produces a delayed response to lower-level resources becoming available.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
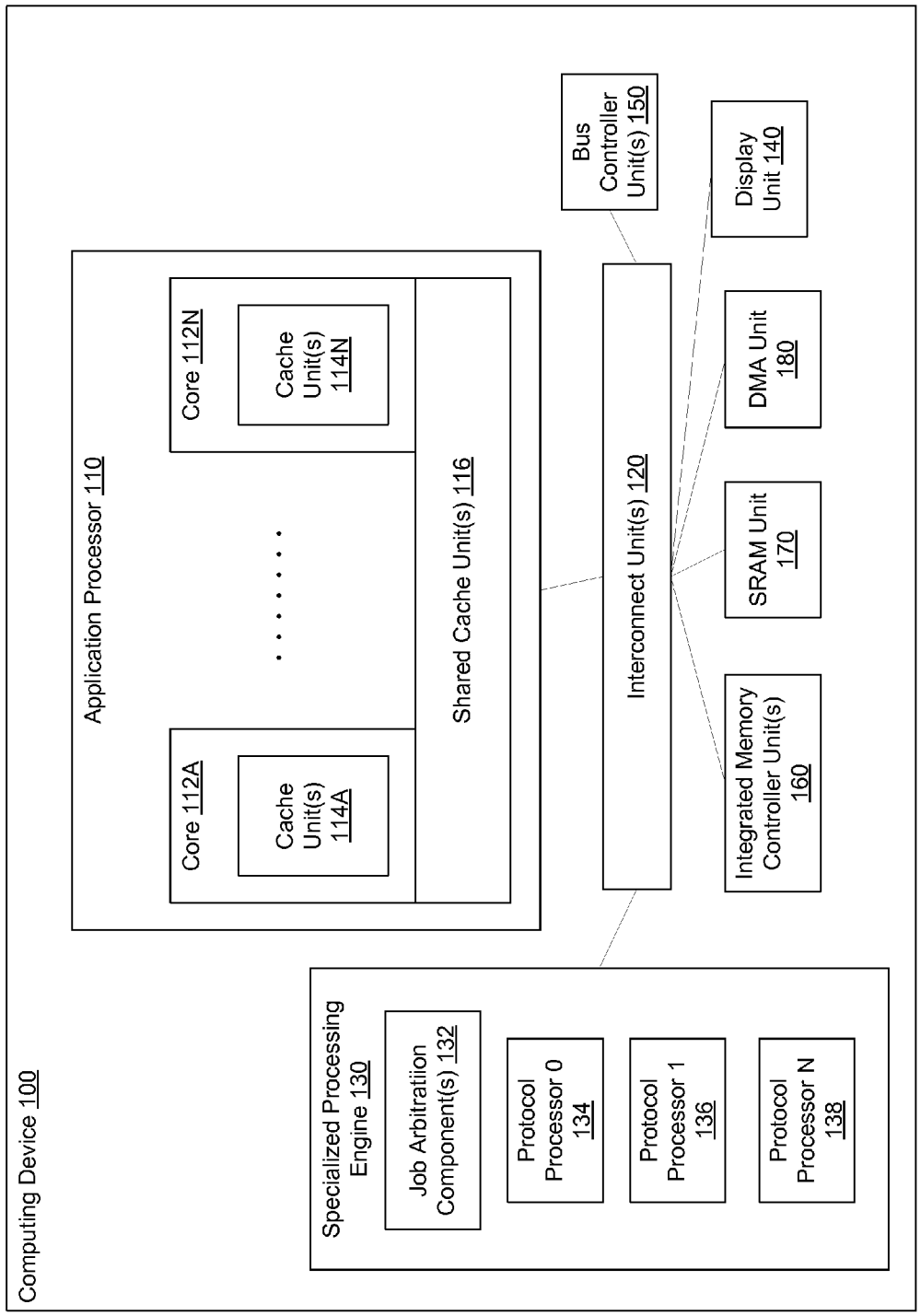
FIG. 1 is a computing device implementing a processing engine implementing job arbitration with ordering status according to embodiments of the disclosure.

Embodiments of the disclosure provide a processing engine implementing job arbitration with ordering status. In one embodiment, the processing engine is capable of processing concurrent jobs by tracking additional information about jobs in progress and jobs awaiting order completion. The processing engine may include job arbitration components (e.g., a job assigner and an order manager) to provide job arbitration with ordering status. The job arbitration components may utilize information (e.g., availability status from job rings, availability status from processors, job completion status from an order manger, etc.) from processors of the processing engine to determine when additional jobs/tasks can be accepted from higher-level processors. In one embodiment, the job arbitration component selects additional jobs based on an allocation of a number of coprocessors, a number of processors available, a number of jobs/tasks finished but awaiting an ordered completion, and a pattern of allocation (i.e., round-robin, weighted round-robin or another scheduling algorithm).

Previous solutions to provide fair allocation of processing resources used a dedicated processor thread to manage these resources. The dedicated processor thread allocates a new thread's job when a number of jobs in an incoming queue falls below a threshold value. This traditional solution utilizes an expensive higher-level thread and also produces a delayed response to lower-level resources becoming available. The delayed response results from the processor utilizing several processor instructions to first evaluate the conditions (queue status, etc.), then to response to the conditions and decide an action. This results in bandwidth scaling issues and uses more power to complete the functions. Embodiments of the invention allow a higher utilization of a limited amount of coprocessor resources, because the job arbitration components monitor jobs that are being processed, as well as jobs that are completed but have not satisfied ordering goals yet. Embodiments also scale to higher throughput demands, as the arbiter and threshold logic within the job arbitration components may be expanded easily without using additional higher-level processor threads.

Although the following embodiments may be described with reference to specific integrated circuits, such as in computing platforms or microprocessors, other embodiments are applicable to other types of integrated circuits and logic devices. Similar techniques and teachings of embodiments described herein may be applied to other types of circuits or semiconductor devices. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below.

Although the following embodiments are described with reference to a processor, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which includes processor logic and circuits used to implement one or more instruction sets. Accordingly, processors with different micro-architectures can share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

In one embodiment, an instruction may include one or more instruction formats. In one embodiment, an instruction format may indicate various fields (number of bits, location of bits, etc.) to specify, among other things, the operation to be performed and the operand(s) on which that operation is to be performed. Some instruction formats may be further broken defined by instruction templates (or sub formats). For example, the instruction templates of a given instruction format may be defined to have different subsets of the instruction format's fields and/or defined to have a given field interpreted differently. In one embodiment, an instruction is expressed using an instruction format (and, if defined, in a given one of the instruction templates of that instruction format) and specifies or indicates the operation and the operands upon which the operation will operate.

FIG. 1 is a computing device 100 implementing a processing engine implementing job arbitration with ordering status according to an embodiment of the disclosure. Computing device 100 includes a system on a chip (SoC) that may include one or more of the cores 112A-112N. Computing device 100 may be a laptop, desktop, handheld PC, personal digital assistant, tablet computing device, engineering workstation, server, network device, network hub, switch, embedded processor, digital signal processor (DSP), graphics device, video game device, set-top box, micro controller, cell phone, portable media player, hand held device, or any other various other electronic device, as is suitable. In general, a huge variety of systems or electronic devices capable of incorporating a processor and/or other execution logic as disclosed herein are generally suitable.

As illustrated, computing device 100 includes an interconnect unit(s) 120 coupled to an application processor 110 which includes a set of one or more cores 112A-N and shared cache unit(s) 116, a specialized processing unit 130; a bus controller unit(s) 150; an integrated memory controller unit(s) 160, a static random access memory (SRAM) unit 170, a direct memory access (DMA) unit 180, and a display unit 140 for coupling to one or more external displays. Other software, hardware, and firmware units may also be part of computing device 100, even though they are not specifically illustrated.

Application processor 110 is a multicore processor with multiple cores 112A-N. In some embodiments, one or more of the cores 112A-N are capable of multi-threading. A memory hierarchy includes one or more levels of cache 114A-N within the cores 112A-N, a set or one or more shared cache units 116, and external memory (not shown) coupled to the set of integrated memory controller units 160. The set of shared cache units 116 may include one or more mid-level caches, such as level 2 (L2), level 3 (L3), level 4 (L4), or other levels of cache, a last level cache (LLC), and/or combinations thereof. While in one embodiment a ring based interconnect unit 120 interconnects the components of computing device 100, alternative embodiments may use any number of well-known techniques for interconnecting such units.

The cores 112A-N may be homogenous or heterogeneous in terms of architecture and/or instruction set. For example, some of the cores 112A-N may be in order while others are out-of-order. As another example, two or more of the cores 112A-N may be capable of execution the same instruction set, while others may be capable of executing only a subset of that instruction set or a different instruction set.

The processor 110 may be a general-purpose processor, such as a Core™ i3, i5, i7, 2 Duo and Quad, Xeon™, Itanium™, XScale™ or StrongARM™ processor, which are available from Intel™ Corporation, of Santa Clara, Calif. Alternatively, the processor may be from another company. The processor 110 may be a special-purpose processor, such as, for example, a network or communication processor, compression engine, graphics processor, co-processor, embedded processor, or the like. The processor 110 may be implemented on one or more chips. The application processor 110 may be a part of and/or may be implemented on one or more substrates using any of a number of process technologies, such as, for example, BiCMOS, CMOS, or NMOS.

In one embodiment, application processor 110 may offload processing tasks to the specialized processing engine 130. Specialized processing engine 130 may include a set of protocol processors 0-N 134, 136, 138 that perform specialized operations, such as communication protocol processing for providing communications (e.g., encryption, compression, datapath processing, etc.) to and from computing device 100, image processing for providing still and/or video camera functionality, audio processing for providing hardware audio acceleration, and/or video processing for providing video encode/decode acceleration, to name a few examples. In some embodiments, protocol processors 0-N 134-138 are cores of the specialized processor 130.

In embodiments of the disclosure, the specialized processing engine 130 includes a job arbitration component 132 to provide job arbitration with ordering status. In one embodiment, job arbitration components may include hardware, software, firmware, or some combination of the above to implement its tasks. For example, job arbitration component 132 may be implemented as hardware allocation logic of the specialized processor 130 having protocol processing cores 0-N 134-138.

The job arbitration component 132 may utilize information from protocol processors 0-N 134-138 to determine when additional jobs/tasks can be accepted from the cores 112A-N. In one embodiment, job arbitration component 132 selects additional jobs based on four factors: 1) allocation of number of coprocessors; 2) number of processors available; 3) number of jobs finished but awaiting an ordered completion; and 4) default pattern of allocation (i.e., round-robin, weighted round-robin or another scheduling algorithm). In one embodiment, the job arbitration component 132 may include a job assigner component and an order manager component that are independent hardware circuitry blocks programmed by the application processor 110. The job assigner may provide inputs to the protocol processors 134-138 via arbitration among rings of tasks (e.g., job entries) assigned from cores 112A-112N of the application processor 110 to the specialized processing engine 130. The job assigner may use information from the order manger to determine if a job entry can actually be completed. The order manager determines the appropriate order in which job entries are put back into the ring from which they originated (in order to be returned to the application processor 110). Further details of job arbitration component 132 are now described with respect to FIG. 2.

Figure 2:
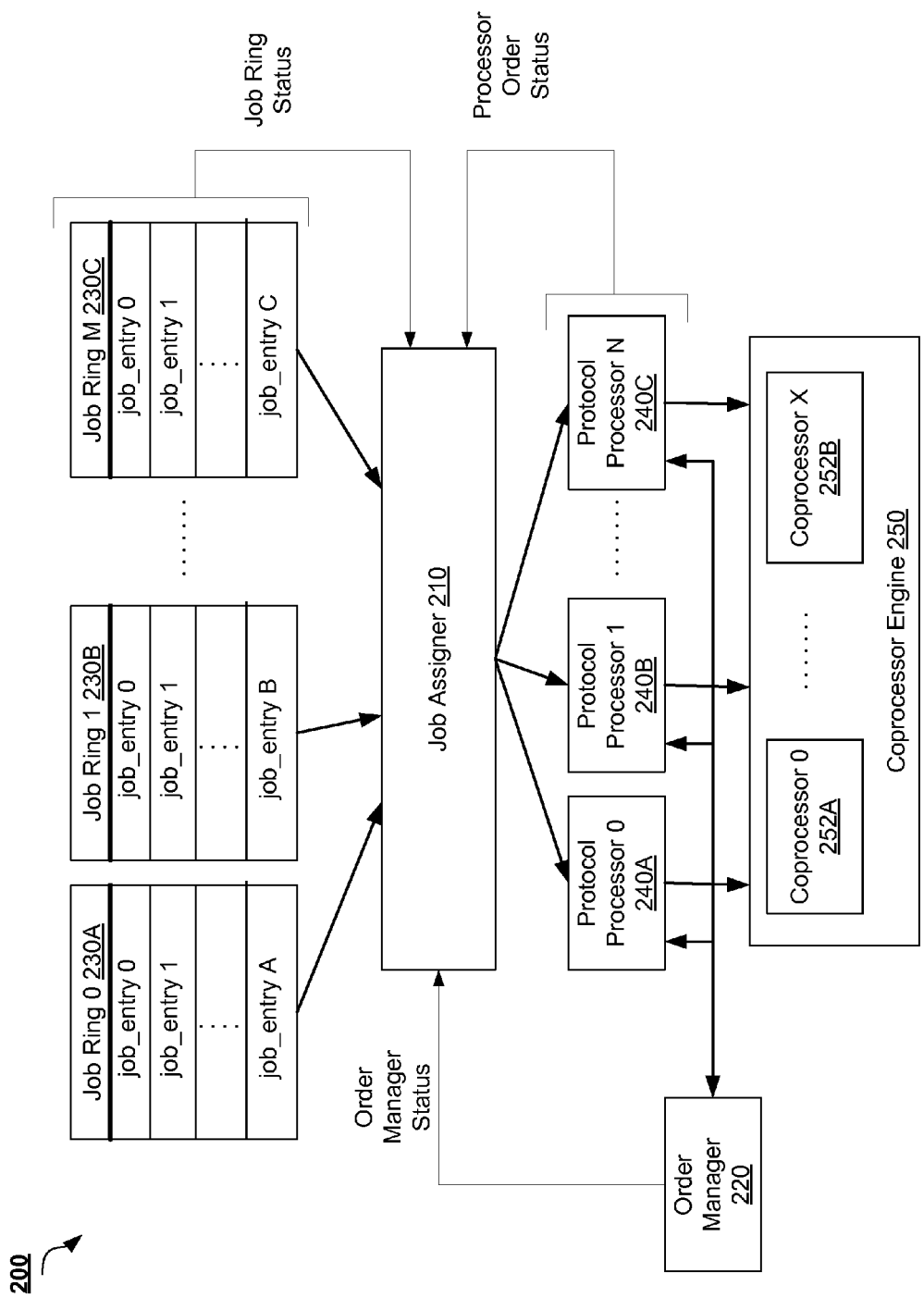
FIG. 2 is a block diagram illustrating a processing engine implementing job arbitration with status according to embodiments of the disclosure.

FIG. 2 is a block diagram illustrating a processing engine 200 implementing job arbitration with ordering status according to embodiments of the disclosure. In one embodiment, processing engine 200 is the same as specialized processing engine 130 of FIG. 1. Processing engine 200 includes job arbitration components of a job assigner 210 and an order manager 220 that may be implemented as hardware, software, firmware, or some combination of the above. In one embodiment, the job arbitration components of the job assigner 210 and the order manager 220 are the same as job arbitration components 132 of FIG. 1. The job assigner 210 and order manager 220 work together to utilize information from protocol processors 0-N 240A-C to indicate when additional jobs can be accepted from higher-level processors.

The processing engine 200 may include N lower-level protocol processors 0-N 240A-C, with each protocol processor 0-N 240A-C capable of processing the instructions of one job. The invention also supports a coprocessor engine 250, containing X individual coprocessors 252A-252B, with various protocol support for specialized processing provided by processing engine 200. In one embodiment, protocol processors 0-N 240A-C are the same as protocol processors 0-N 134-138 of FIG. 1, and the higher-level processor that is providing the jobs may be application processor 110. Note that the coprocessors 252A-252B may be external to processing engine 200 and are a shared resource utilized by protocol processors 0-N 240A-C.

Incoming jobs from a higher-level processor, such as application processor 110 of FIG. 1, that are awaiting processing by processing engine 200 may be maintained in multiple job ring queues, shown as job ring 0-M 230A-C. In one embodiment, the job rings 230A-C may be located in memory close to the protocol processors 240A-C. However, in other embodiment, job rings 230A-C may be located in system memory near the assigning application processor. Job rings 230A-C may be implemented as hardware, software, firmware, or any combination of the above. For example, each job ring 230A-C may be implemented as a circular buffer. The job rings 230A-C may be configured to support the jobs (e.g., tasks) associated with one individual high-level processing thread of the higher-level processor. Each job ring 230A-C may support a unique number of incoming jobs, as shown with depths A, B, C in the FIG. 2.

In one embodiment, each job ring 0-M 230A-C includes a request ring portion and a response ring portion. The request ring may include the job entries waiting to be processed by processing engine 200. The response ring may include the job entries that originated in the request ring and have been completely processed by the processing engine 200. The job entries in the response ring are to be retired back to the higher-level processor. Note that in embodiments of the disclosure, the number of protocol processors 240A-C does not have to match the number of coprocessors 252A-252B or job rings 230A-C.

The order manager 220 may be implemented as hardware, software, firmware, or any combination of the above. In one embodiment, the order manager 220 is responsible for marking jobs 'complete' when the job entries of the job are completed in a correct response order. The order manager 220 ensures response ordering of whole jobs that came from a job ring 230A-C, relative to other jobs in that ring 230A-C. In one embodiment, the response order of a particular job entry within a job is indicated within the job entry (e.g., via an order identifier (ID) and/or order instruction). Note that the order manager 220 is not concerned with ordering of individual instructions within a job or job entry.

In embodiments of the invention, a job entry may be completely finished by a protocol processor 0-N 240A-C, but the order manager 220 may withhold the job entry from being indicated as finished with respect to the job ring 230A-C. In one embodiment, the order manager 220 withholds a job entry from finishing by preventing the processed job entry from being written back (or otherwise indicated as complete) to a response portion of the job ring 0-M 230A-C originating the job entry. The order manager 220 may withhold a job entry from finishing when an order block/order ID associated with the job entry indicates that proper ordering within the associated job of the job entry has not yet been satisfied (e.g., other job entries prior to the job entry at issue in terms of order ID have not been processed yet by protocol processors 0-N 240A-C).

In one embodiment, the order manager tracks a current completion ID number for each job ring 230A-C. If the received order ID for a processed job entry is greater than this ID, then the order manager 220 prevents the job entry from completing (e.g., does not write to or indicate completion of the job entry at the job ring 230A-C). When the current completion ID number is updated to equal a currently withheld job or a job entry order ID reported as completed from the protocol processor 240A-C, then the order manager 220 sends out the job entry (e.g., a pointer to that job entry) that matches the current completion ID number for completion at the corresponding job ring 230A-C. The order manager 220 also increments the current completion ID number for the job ring 230A-C being tracked at the order manager 220.

In some embodiments, in the window of time where a job entry is withheld by order manager 220, the protocol processor 240A-C that processed that job entry can accept another job entry while the original job entry remains dormant, until the ordering is satisfied. This may allow additional job entries to be scheduled and efficiently uses hardware resources of processing engine 200.

In one embodiment, the job assigner 210 selects jobs to pass to protocol processors 0-N 240A-C for specialized processing based on four factors: 1) allocation of number of coprocessors 252A-B; 2) number of processors 0-N available; 3) number of jobs finished but awaiting an ordered completion; and 4) a default pattern of allocation (e.g., round-robin, weighted round-robin, or another scheduling algorithm). The job assigner 210 may receive availability status from the job rings 230A-C, availability status from the protocol processors 240A-C, and job entry completion status from the order manager 220. Availability status from the job rings 0-M 230A-C may indicate if a new job entry is available for assignment. Availability status from protocol processors 0-N 240A-C may indicate whether one of the individual protocol processors 240A-C is available to receive a job entry for processing. Job entry completion status from order manager 220 may indicate whether job entries from each job ring 230A-C have finished processing, but are awaiting proper ordering.

Using this status information, the job assigner 210 may compare the received information to pre-programmed threshold values. In one embodiment, a thresholding component (e.g., implemented in hardware, software, firmware, or any combination of the above) may perform the comparing. For example, the job assigner 210 may maintain registers that indicate a threshold condition for job entries on a per-job ring 230A-C basis. For example, the job assigner 210 may accept a new job entry from a job ring 0 230A for assignment to any one of protocol processors 0-N 240A-C when all threshold conditions for that job ring 0 230A have been satisfied. Assume that the threshold conditions for job ring 0 230A are configured at job assigner 210 to include a total of 2 job entries being processed by the protocol processors 0-N 240A-C, in addition to 2 job entries being held (e.g., withheld from completion) by the order manager 220 for job ring 0 230A. The job assigner 210 may select a job entry from the job ring 0 230A when these threshold conditions are not exceeded by job ring 0 230A.

Based on the comparison to the threshold values, the job assigner 210 may accept an additional job from job rings 230A-C and assign it to one of the connected protocol processors 240A-C. In one embodiment, an arbitration component (not shown) of the job assigner 210 may perform the assignment of job entries to processors. The job assigner 210 may select a job ring 230A-C on a round-robin basis from the set of job rings 230A-C that have satisfied the threshold conditions, as it has resources available. When a job ring 230A-C is selected, the job assigner 210 may retrieve the job entry located at the head of the job ring 230A-C for assignment to any of the available protocol processors 0-N 240A-C. In one embodiment, the selection of a processor 240A-C from available protocol processors 240A-C (based on processor availability status received) may be performed using fair arbitration between the protocol processors 240A-C.

In one embodiment, when a protocol processor 0-N 240A-C receives a job from job assigner 210, it may generate a low-level instruction for the job entry to pass to the coprocessor engine 250 for completion of the specialized processing of the job entry. The coprocessor engine 250 may utilize one or more of coprocessors 0-X 252A-B to perform the processing of job entry. Once the one or more selected coprocessors 252A-B finish processing of the job entry, the job entry is passed to the order manager 220 to maintain the job ordering of the job entry, as discussed above.

In some embodiments, job entries of a job ring 230A-C may not have any associated response ordering. In this situation, the order manager 220 may be bypassed, and the job entry indicated as completely in the job ring directly from the protocol processor 240A-C.

Figure 3:
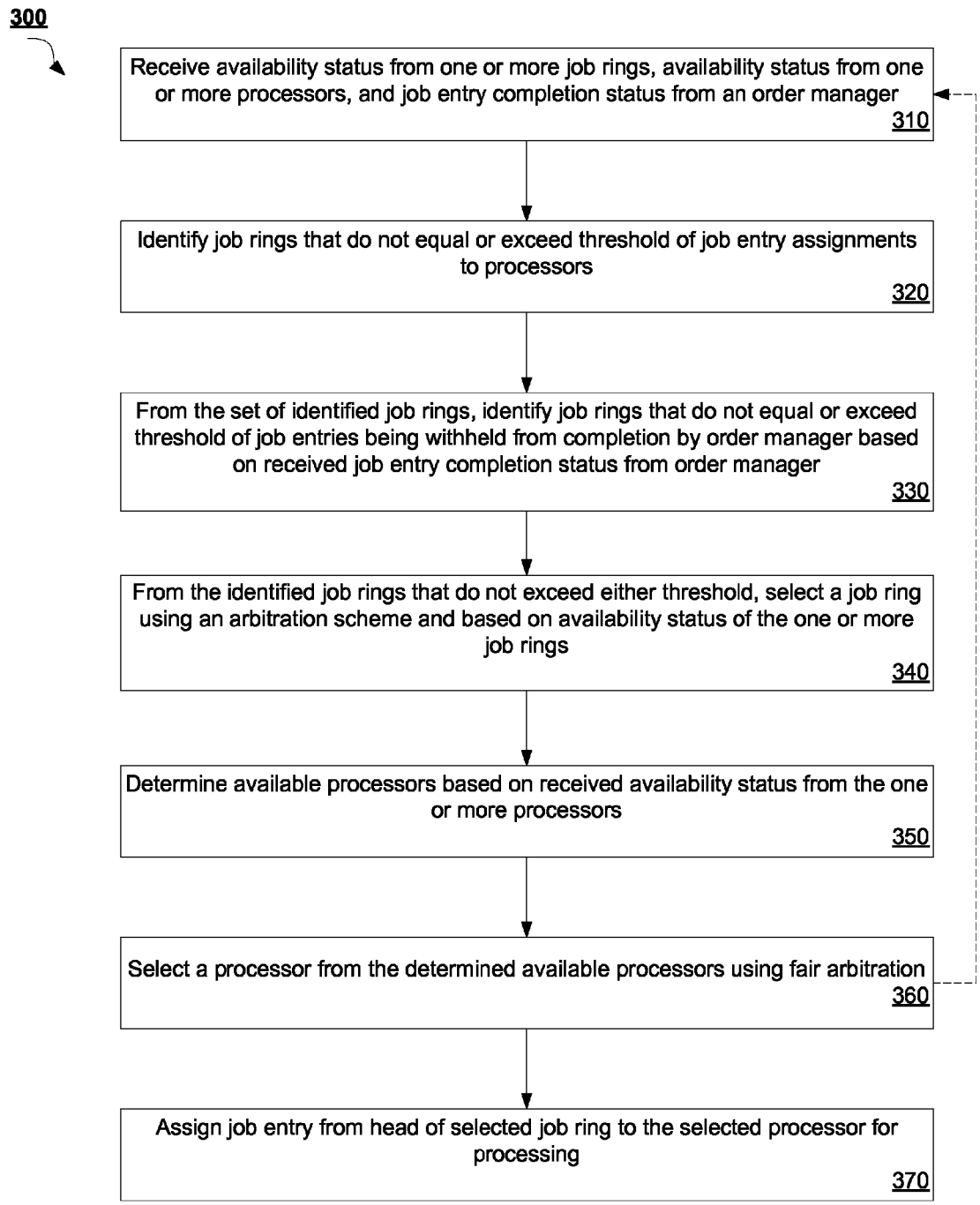
FIG. 3 is a flow diagram illustrating a method for implementing job arbitration with ordering status by a job assigner according to an embodiment of the disclosure.

FIG. 3 is a flow diagram illustrating a method 300 for implementing job arbitration with ordering status by a job assigner according to an embodiment of the disclosure. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by job assigner 210 of FIG. 2. Although method 300 is shown in sequential order, some or all of blocks 310-360 may be performed in parallel to increase performance.

Method 300 begins at block 310 where an availability status from one or more job rings, an availability status from one or more processors, and a job entry completion status from an order manager are received by a job assigner. The availability status from the job rings may indicate if a new job entry is available for assignment from the job rings. The availability status from processors may indicate whether one of the individual processors is available to receive a job entry for processing. The job entry completion status may indicate whether job entries from each job ring have finished processing, but are awaiting proper ordering.

At block 320, job rings that do not equal or exceed a threshold number of job entry assignments to processors are identified. In one embodiment, the job assigner may include registers that maintain threshold conditions for job entries on a per-job ring basis. For example, a register may store a threshold value defining a number of job entries from a job ring that can currently be assigned out from a job ring to processors for processing. The job assigner may maintain status information for each job ring that indicates how many job entries are currently being processed from the job ring. The job assigned may utilize this status information to identify those job rings that have are below the threshold condition of job entry assignments.

Then, at block 330, the job assigner may identify job rings, from the set of identified job rings from block 320, which do not equal or exceed a threshold number of job entries being withheld from completion by an order manager. In one embodiment, the received job entry completion status information received from the order manager is used determine how many job entries from each job ring are being withheld from completion. This is compared to a threshold condition maintained by the job assigner to determine the job rings that are below the threshold condition of job entries being withheld.

Subsequently, at block 340, a job ring is selected from the identified job rings from block 330 using an arbitration scheme. In addition, the job ring selected may be based on the received availability status sent from the one or more job rings in that the job ring selected should be available for job entry assignment purposes. In one embodiment, the arbitration scheme may include weighted round-robin arbitration, where each job ring is assigned a weight, and selection of a job ring proceeds in a round-robin fashion based on the weight. Other arbitration schemes may also be utilized in embodiments of the invention.

Then, at block 350, available processors are determined from the one or more processors based on the received availability status of the one or more processors. At block 360, a processor is selected from the determined available processors. In one embodiment, the processor is selected utilizing a fair arbitration scheme, such as a round robin arbitration. In one embodiment, if any of the conditions discussed in blocks 310 through 360 are not satisfied, then method 300 may return to block 310 to continue to arbitrate among job rings. Lastly, at block 370, a job entry from the head of the selected job ring is assigned to the selected processor for processing.

Figure 4:
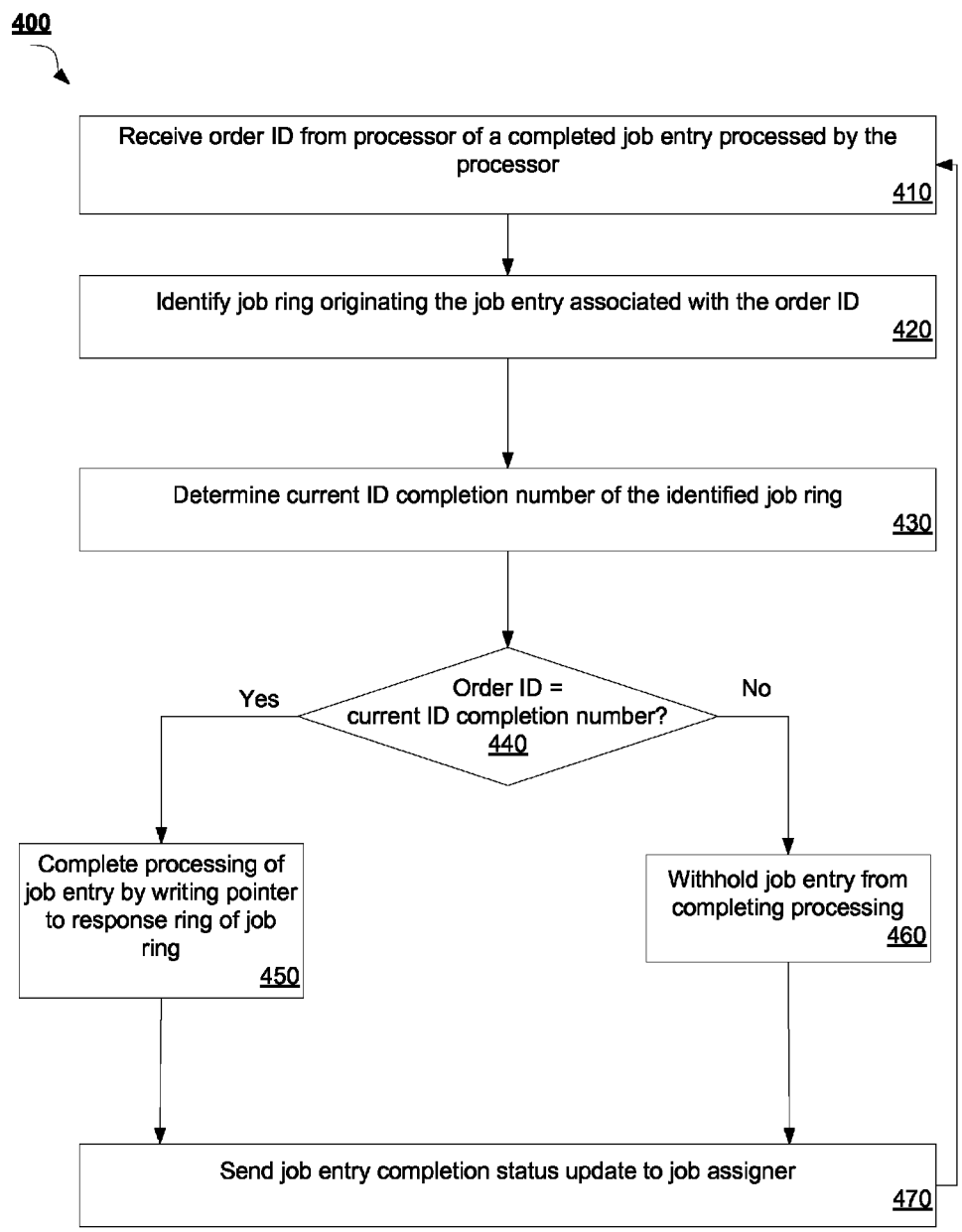
FIG. 4 is a flow diagram illustrating a method for implementing job arbitration with ordering status by an order manager according to an embodiment of the disclosure.

FIG. 4 is a flow diagram illustrating a method 400 for implementing job arbitration with ordering status by an order manager according to an embodiment of the disclosure. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by order manager 220 of FIG. 2.

Method 400 begins at block 410 where an order ID from a processor is received. In one embodiment, the order ID is associated with a job entry that the processors completed processing. The order ID may refer to a response order of the job entry within a job to which the job entry belongs. In some embodiment, the processing of the job entry included the processor passing low-level instructions associated with the job entry to one or more coprocessors specialized in processing the low-level instructions of the job entry. In one embodiment, there is an implicit mapping of a job entry ID to a ring number of the originating job ring and the order ID.

At block 420, a job ring that originated the job entry associated with the received order ID is identified. In one embodiment, the job ring has the completion ID, but the job entry is pulled off the job ring and no longer exists on the job ring. The processor can track the job information, send the completion ID to the order manager, and send a status update to the response ring. Then, at block 430, a current ID completion number of the identified job ring is determined. In one embodiment, the order manager maintains a register for each job ring, where the register stores a value indicating the last job entry order ID that was marked as completed for the job ring.

At decision block 440, it is determined whether the received order ID is equal to the current ID completion number for the job ring. If so, then method 400 proceeds to block 450 where processing of the job entry is completed by writing a completion message of the job entry to a response ring portion of the job ring. In some embodiment, other processes for indicating completed processing of a job entry may also be utilized. Then, at block 470, a job entry completion status update is sent to the job assigner to inform the job assigner that the particular job entry for the job ring has completed processing.

If, at decision block 440, the order ID is not equal to the current ID completion number, then method 400 proceeds to block 460. At block 460, the job entry is withheld from processing completion by the order manager. In one embodiment, the order manager may hold a completion message for the job entry from sending to the job ring until the ordering requirements of the job ring are met. The ordering requirements may be denoted by a value of the order ID. For example, assume job entries assigned order ID values 3, 4, 5 are sent to 3 separate protocol processors in parallel and then completed out of order (i.e., 5, 4, 3). The order manager may hold the completion messages for numbers 4 and 5 until number 3 is ready. Then, the order manger would return the messages in the order of 3, 4, 5.

Then, at block 470, a job entry completion status update (e.g., an ID of the request ring associated with the completion message) is sent to the job assigner to inform the job assigner that the particular job entry for the job ring is still waiting on completion at the order manager. From block 470, method 400 returns to block 410 for the order manager to continue receiving pointers and order IDs from the processors.

Figure 5:
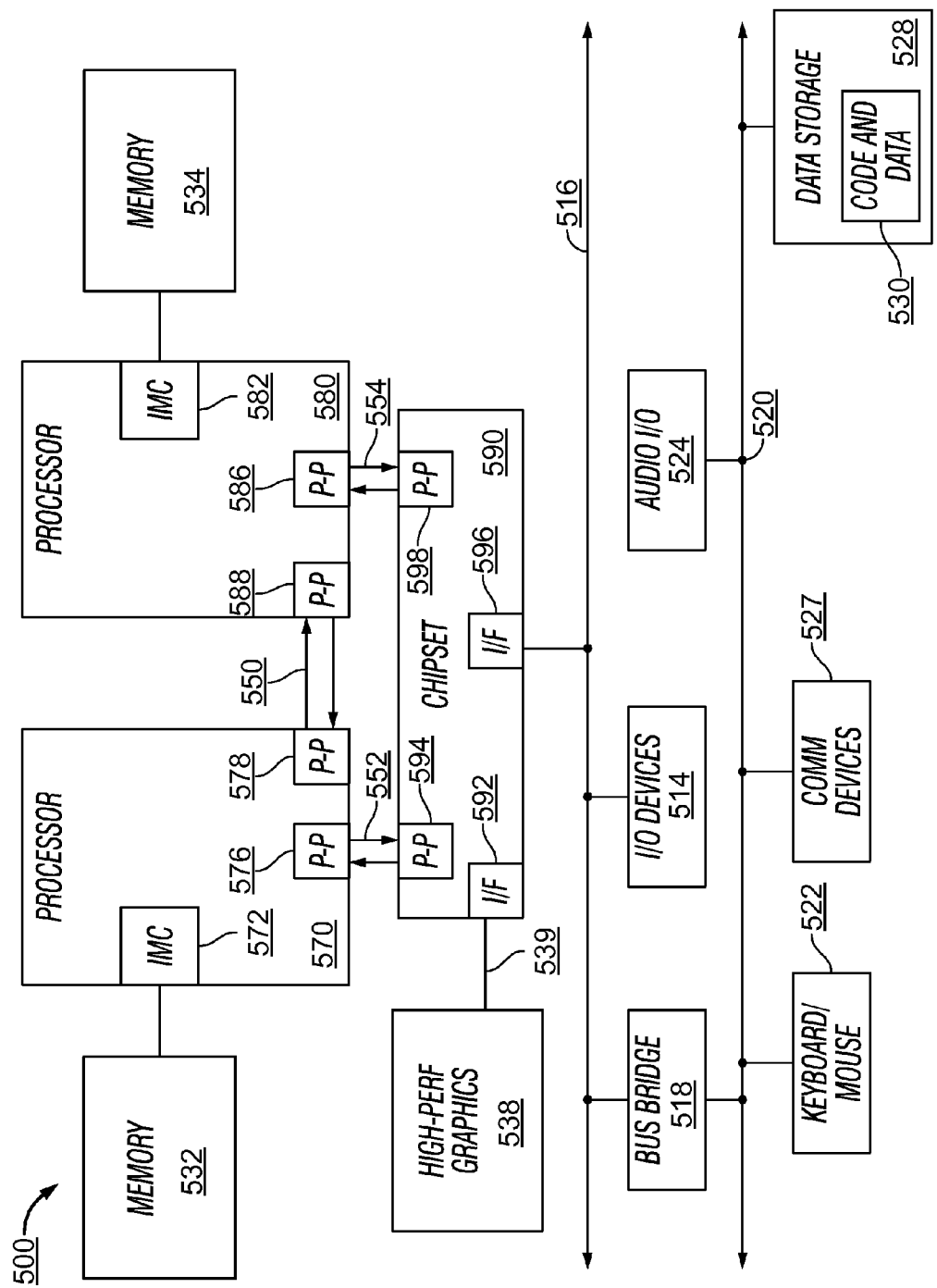
FIG. 5 is a block diagram of a computer system according to one embodiment.

Referring now to FIG. 5, shown is a block diagram of a system 500 in accordance with an embodiment of the present invention. As shown in FIG. 5, multiprocessor system 500 is a point-to-point interconnect system, and includes a first processor 570 and a second processor 580 coupled via a point-to-point interconnect 550. While shown with only two processors 570, 580, it is to be understood that the scope of embodiments of the invention is not so limited. In other embodiments, one or more additional processors may be present in a given processor. In one embodiment, the multiprocessor system 500 may implement job arbitration with ordering status as described herein.

Processors 570 and 580 are shown including integrated memory controller units 572 and 582, respectively. Processor 570 also includes as part of its bus controller units point-to-point (P-P) interfaces 576 and 578; similarly, second processor 580 includes P-P interfaces 586 and 588. Processors 570, 580 may exchange information via a point-to-point (P-P) interface 550 using P-P interface circuits 578, 588. As shown in FIG. 5, IMCs 572 and 582 couple the processors to respective memories, namely a memory 532 and a memory 534, which may be portions of main memory locally attached to the respective processors.

Processors 570, 580 may each exchange information with a chipset 590 via individual P-P interfaces 552, 554 using point to point interface circuits 576, 594, 586, 598. Chipset 590 may also exchange information with a high-performance graphics circuit 538 via a high performance interconnect 539 with a high-performance graphics interface 592.

A shared cache (not shown) may be included in either processor or outside of both processors, yet connected with the processors via P-P interconnect, such that either or both processors' local cache information may be stored in the shared cache if a processor is placed into a low power mode.

Chipset 590 may be coupled to a first bus 516 via an interface 596. In one embodiment, first bus 516 may be a Peripheral Component Interconnect (PCI) bus, or a bus such as a PCI Express bus or another third generation I/O interconnect bus, although the scope of the present invention is not so limited.

As shown in FIG. 5, various I/O devices 514 may be coupled to first bus 516, along with a bus bridge 518 which couples first bus 516 to a second bus 520. In one embodiment, second bus 520 may be a low pin count (LPC) bus. Various devices may be coupled to second bus 520 including, for example, a keyboard and/or mouse 522, communication devices 527 and a storage unit 528 such as a disk drive or other mass storage device which may include instructions/code and data 530, in one embodiment. Further, an audio I/O 524 may be coupled to second bus 520. Note that other architectures are possible. For example, instead of the point-to-point architecture of FIG. 5, a system may implement a multi-drop bus or other such architecture.

Figure 6:
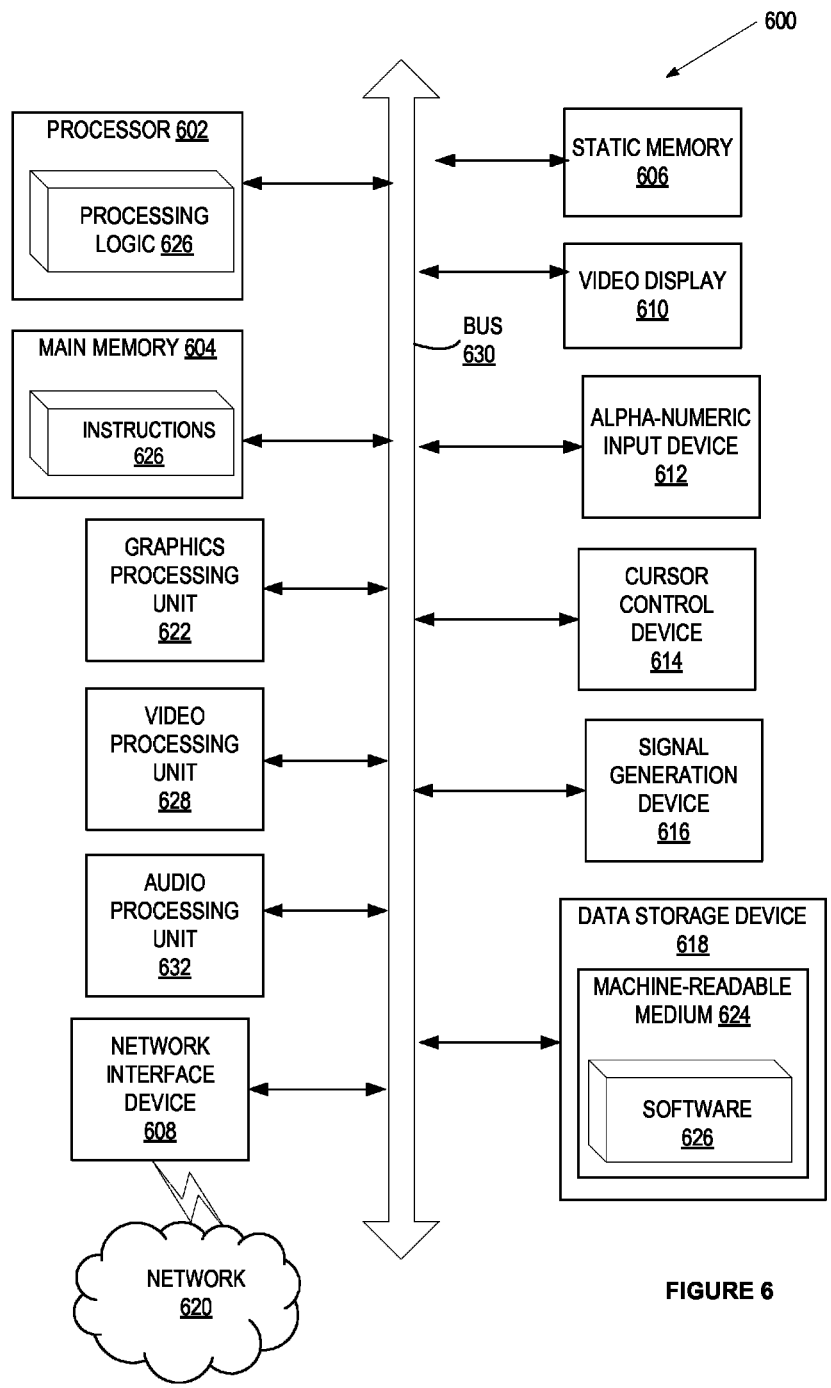
FIG. 6 illustrates a block diagram of one embodiment of a computer system.

FIG. 6 illustrates a diagrammatic representation of a machine in the example form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 600 includes a processing device 602, a main memory 604 (e.g., read-only memory (ROM), flash memory, dynamic random access memory (DRAM) (such as synchronous DRAM (SDRAM) or DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. In one embodiment, processing device 602 may include one or processing cores. The processing device 602 is configured to execute the processing logic 626 for performing the operations and steps discussed herein. In one embodiment, processing device 602 is the same as specialized processing engine 130 described with respect to FIG. 1 that implements job arbitration with ordering status as described herein with embodiments of the disclosure.

The computer system 600 may further include a network interface device 608 communicably coupled to a network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker). Furthermore, computer system 600 may include a graphics processing unit 622, a video processing unit 628, and an audio processing unit 632.

The data storage device 618 may include a machine-accessible storage medium 624 on which is stored software 626 implementing any one or more of the methodologies of functions described herein, such as implementing job arbitration with ordering status as described above. The software 626 may also reside, completely or at least partially, within the main memory 604 as instructions 626 and/or within the processing device 602 as processing logic 626 during execution thereof by the computer system 600; the main memory 604 and the processing device 602 also constituting machine-accessible storage media.

The machine-readable storage medium 624 may also be used to store instructions 626 implementing job arbitration components that implement job arbitration with ordering status, such as described with respect to job arbitration components 132 in FIG. 1, and/or a software library containing methods that call the above applications. While the machine-accessible storage medium 628 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

The following examples pertain to further embodiments. Example 1 is a system for implementing job arbitration with ordering status comprising a plurality of job rings to receive jobs from an originating processing device, a plurality of processors communicably coupled with a plurality of coprocessors, and an order manager communicably coupled to the plurality of processors. The system of Example 1 further comprises a job assigner communicably coupled to the plurality of the job rings and the plurality of processors, the job assigner to receive availability status from each of the plurality of job rings, availability status from each of the plurality of processors, and job entry completion status from an order manager, and select, based on both of the received availability statuses and the job entry completion status, a processor to receive the assignment of a job entry from one of the plurality of job rings for processing.

In Example 2, the subject matter of Example 1 can optionally include wherein the job assigner further to identify, based on the received job entry completion status, a set of job rings from the plurality of job rings that do not exceed threshold conditions maintained by the job assigner, and select, from the identified set of job rings, a job ring from which to pull a job entry for assignment, wherein the selecting is based on the received availability status of the plurality of job rings.

In Example 3, the subject matter of any one of Examples 1-2 can optionally include wherein each of the job rings tracks tasks corresponding to a thread of the originating processing device. In Example 4, the subject matter of any one of Examples 1-3 can optionally include wherein the order manager further to receive an order identifier (ID) of the job entry when the selected processor completes processing of the job entry, determine the job ring from which the job entry originated, determine a current order ID completion number associated with the determined job ring, when the determined current order ID completion number equals the received order ID of the job entry, complete processing of the job entry, and when the determined current order ID completion number does not equal the received order ID, withhold the job entry from completion until the current order ID completion number does equal the received order ID.

In Example 5, the subject matter of any one of Examples 1-5 can optionally include wherein withholding the job entry from completion further comprises the order manager to place a completion message for the job entry and the received order ID in a queue, and send a job entry completion status update to the job assigner that informs the job assigner that the job entry is awaiting completion at the order manager. In Example 6, the subject matter of any one of Examples 1-5 can optionally include wherein completing the processing of the job entry further comprises the order manager to write of the completion message for the job entry to a response ring of the job ring originating the job entry, and send a job entry completion status update to the job assigner that informs the job assigner that processing of the job entry is completed.

In Example 7, the subject matter of any one of Examples 1-6 can optionally include wherein the threshold conditions comprise a number of pending job entries per job ring that can be pending processing by the one or more processors, and a number of job entries per job ring that can be awaiting completion at the order manager. In Example 8, the subject matter of any one of Examples 1-7 can optionally include wherein each job ring of the plurality of job rings is implemented as a circular buffer, and wherein the job assigner further to select the job entry from the head of the selected job ring.

In Example 9, the subject matter of any one of Examples 1-8 can optionally include wherein the job assigner further to track, for each job ring of the plurality of job rings, a number of job entries from the job ring that are currently being processed by the one or more processors. In Example 10, the subject matter of any one of Examples 1-9 can optionally include wherein the job assigner to identify the set of job rings is further based on the tracked number of job entries for each job ring. All optional features of the system described above may also be implemented with respect to the method or process described herein.

Example 11 is a method for implementing job arbitration with ordering status comprising receiving, by a job assigner communicably coupled to a plurality of processors, availability status from a plurality of job rings, availability status from the plurality of processors, and job entry completion status from an order manager, identifying, based on the received job entry completion status, a set of job rings from the plurality of job rings that do not exceed threshold conditions maintained by the job assigner, selecting, from the identified set of job rings, a job ring from which to pull a job entry for assignment, wherein the selecting is based on the received availability status of the plurality of job rings, and selecting, based on the received availability status of the plurality of processors, a processor to receive the assignment of the job entry for processing.

In Example 12, the subject matter of Example 11 can optionally include wherein each of the job rings tracks tasks corresponding to a thread of the originating processing device. In Example 13, the subject matter of any one of Examples 11-12 can optionally include further comprising receiving, from the order manager, a job entry completion status update that indicates the job entry withheld at the order manager, wherein the job entry is withheld by the order manager when, subsequent to processing of the job entry at the selected processor, an order identifier (ID) of the job entry does not match a current order ID completion number of the job ring that originated the job entry.

In Example 14, the subject matter of any one of Examples 11-13 can optionally include wherein completing the processing of the job entry further comprises the order manager to receive, from the order manager, a job entry completion status update that indicates the job entry is complete, wherein the job entry is indicated as complete by the order manager when, subsequent to processing of the job entry at the selected processor, an order identifier (ID) of the job entry matches a current order ID completion number of the job ring that originated the job entry. In Example 15, the subject matter of any one of Examples 11-14 can optionally include wherein the threshold conditions comprise a number of pending job entries per job ring that can be pending processing by the one or more processors, and a number of job entries per job ring that can be awaiting completion at the order manager.

In Example 16, the subject matter of any one of Examples 11-15 can optionally include wherein each job ring of the plurality of job rings is implemented as a circular buffer. In Example 17, the subject matter of any one of Examples 11-16 can optionally include further comprising selecting the job entry from the head of the selected job ring.

In Example 18, the subject matter of any one of Examples 11-17 can optionally include further comprising tracking, for each job ring of the plurality of job rings, a number of job entries from the job ring that are currently being processed by the one or more processors. In Example 19, the subject matter of any one of Examples 11-18 can optionally include further comprising identifying the set of job rings is further based on the tracked number of job entries for each job ring.

Example 20 is an apparatus for implementing job arbitration with ordering status. In Example 20 the apparatus includes a plurality of registers to store availability status from each of the plurality of job rings, availability status from each of the plurality of processors, job entry completion status from an order manager, a threshold for number of job entries pending, and a threshold for number of job entries withheld from completion. The apparatus of Example 20 further includes a thresholding component communicably coupled to the plurality of registers, the thresholding component to determine a number of job entries currently processing from each of the plurality of job rings, determine a number of job entries currently withheld from completion from each of the plurality of job rings, and identify a set of job rings from the plurality of job rings that do not exceed either of the threshold for number of job entries pending or the threshold for number of job entries withheld from completion. The apparatus of Example 20 further includes an arbitration component to communicably coupled to the plurality of registers and the thresholding component, the arbitration component to select, from the identified set of job rings, a job ring based on a round-robin selection scheme, and select, based on the received availability status of the plurality of processors, a processor to process a job entry from the selected job ring based on the round-robin selection scheme.

In Example 21, the subject matter of Example 20 can optionally include wherein each of the plurality of job rings tracks tasks corresponding to a thread of the originating processing device. In Example 22, the subject matter of any one of Examples 20-21 can optionally include wherein the order manager to receive an order identifier (ID) of the job entry when the selected processor completes processing of the job entry, determine the job ring from which the job entry originated, determine a current order ID completion number associated with the determined job ring, when the determined current order ID completion number equals the received order ID of the job entry, complete processing of the job entry, and when the determined current order ID completion number does not equal the received order ID, withhold the job entry from completion until the current order ID completion number does equal the received order ID.

In Example 23, the subject matter of any one of Examples 20-22 can optionally include wherein withholding the job entry from completion further comprises the order manager to place a completion message for the job entry and the received order ID in a queue, and send a job entry completion status update to the job assigner that informs the job assigner that the job entry is awaiting completion at the order manager. In Example 24, the subject matter of any one of Examples 20-23 can optionally include wherein completing the processing of the job entry further comprises the order manager to write of the completion message for the job entry to a response ring of the job ring originating the job entry, and send a job entry completion status update to the job assigner that informs the job assigner that processing of the job entry is completed.

In Example 25, the subject matter of any one of Examples 20-24 can optionally include wherein the threshold conditions comprise a number of pending job entries per job ring that can be pending processing by the one or more processors, and a number of job entries per job ring that can be awaiting completion at the order manager. In Example 26, the subject matter of any one of Examples 20-25 can optionally include wherein each job ring of the plurality of job rings is implemented as a circular buffer, and wherein the job assigner further to select the job entry from the head of the selected job ring. In Example 27, the subject matter of any one of Examples 20-26 can optionally include wherein the thresholding component further to track, for each job ring of the plurality of job rings, a number of job entries from the job ring that are currently being processed by the one or more processors. All optional features of the apparatus described above may also be implemented with respect to the method or process described herein.

Example 28 is non-transitory computer-readable medium for implementing job arbitration with ordering status. In Example 28, the non-transitory machine-readable medium includes data that, when accessed by a processing device, cause the processing device to perform operations comprising receiving, by an order manager, an order identifier (ID) of a job entry when the processor completes processing of the job entry, determining a job ring of a plurality of job rings from which the job entry originated, determining a current order ID completion number associated with the determined job ring, when the determined current order ID completion number equals the received order ID of the job entry, completing processing of the job entry, and when the determined current order ID completion number does not equal the received order ID, withholding the job entry from completion until the current order ID completion number does equal the received order ID.

In Example 29, the subject matter of Example 28 can optionally include wherein the withholding the job entry from completion further comprises placing a completion message for the job entry and the received order ID in a queue, and sending a job entry completion status update to a job assigner, the job entry completion status update to inform the job assigner that the job entry is awaiting completion at the order manager. In Example 30, the subject matter of any one of Examples 28-29 can optionally include wherein the completing the processing of the job entry further comprises writing of the completion message for the job entry to a response ring of the job ring originating the job entry, and sending a job entry completion status update to a job assigner, the job entry completion status update to inform the job assigner that processing of the job entry is completed.

In Example 31, the subject matter of any one of Examples 28-30 can optionally include wherein a job assigner that is communicably coupled to the order manager is to receive availability status from the plurality of job rings, availability status from the plurality of processors, and job entry completion status from the order manager, identify, based on the received job entry completion status, a set of job rings from the plurality of job rings that do not exceed threshold conditions maintained by the job assigner, select, from the identified set of job rings, a job ring from which to pull another job entry for assignment, wherein the selecting is based on the received availability status of the plurality of job rings, and select, based on the received availability status of the plurality of processors, a processor to receive the assignment of the another job entry for processing.

In Example 32, the subject matter of any one of Examples 28-31 can optionally include wherein the threshold conditions comprise a number of pending job entries per job ring that can be pending processing by the one or more processors, and a number of job entries per job ring that can be awaiting completion at the order manager.

Example 33 is an apparatus for implementing job arbitration with ordering status comprising means for receiving availability status from a plurality of job rings, availability status from a plurality of processors, and job entry completion status from an order manager, means for identifying, based on the received job entry completion status, a set of job rings from the plurality of job rings that do not exceed threshold conditions maintained by the job assigner, means for selecting, from the identified set of job rings, a job ring from which to pull a job entry for assignment, wherein the selecting is based on the received availability status of the plurality of job rings, and means for selecting, based on the received availability status of the plurality of processors, a processor to receive the assignment of the job entry for processing. In Example 34, the subject matter of Example 33 can optionally include the apparatus further configured to perform the method of any one of the Examples 12 to 19.

Example 35 is at least one machine readable medium comprising a plurality of instructions that in response to being executed on a computing device, cause the computing device to carry out a method according to any one of Examples 11-19. Example 36 is an apparatus for implementing job arbitration with ordering status, configured to perform the method of any one of Examples 11-19. Example 37 is an apparatus comprising means for performing the method of any one of Examples 11-19. Specifics in the Examples may be used anywhere in one or more embodiments.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the microcontroller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A system, comprising:
   a plurality of job rings to receive jobs from an originating processing device;
   a plurality of processors communicably coupled with a plurality of coprocessors;
   an order manager communicably coupled to the plurality of processors; and a job assigner communicably coupled to the plurality of the job rings and the plurality of processors, the job assigner to, for respective job entries of a job:

receive availability status from each of the plurality of job rings, availability status from each of the plurality of processors, and job entry completion status from the order manager; and select, responsive to both the received availability statuses and the job entry completion status, a processor of the plurality of processors to receive the assignment of a job entry from one of the plurality of job rings for processing; and wherein the order manager is to:

mark the job corresponding to the job entries as complete when the job entries are executed in a correct response order; and delay writing a result of a first job entry of the job entries back to an originating job ring when a second job entry of the job entries has not yet been completed and the first job entry is to be written back to the originating job ring after a result of the second job entry according to the correct response order.

2. The system of claim 1, wherein the job assigner further to:

identify, based on the job entry completion status, a set of job rings from the plurality of job rings that do not exceed threshold conditions maintained by the job assigner; and select, from the set of job rings, a job ring from which to pull the job entry for assignment, wherein the selecting is responsive to the availability status of the plurality of job rings.

3. The system of claim 1, wherein each of the job rings tracks tasks corresponding to a thread of the originating processing device.

4. The system of claim 1, wherein the order manager further to:

receive an order identifier (ID) of the first job entry when the selected processor completes processing of the first job entry;

determine the originating job ring from which the first job entry originated;

determine a current order ID completion number associated with the originating job ring;

when the current order ID completion number equals the received order ID of the first job entry, complete processing of the first job entry; and when the current order ID completion number does not equal the order ID, withhold the first job entry from completion until the current order ID completion number does equal the received order ID.

5. The system of claim 4, wherein withholding the first job entry from completion further comprises the order manager to:

place a completion message for the first job entry and the received order ID in a queue; and send a job entry completion status update to the job assigner that informs the job assigner that the first job entry is awaiting completion at the order manager.

6. The system of claim 4, wherein completing the processing of the first job entry further comprises the order manager to:

write a completion message of the first job entry to a response ring of the job ring originating the first job entry; and send a job entry completion status update to the job assigner that informs the job assigner that processing of the first job entry is completed.

7. The system of claim 2, wherein the threshold conditions comprise:

a number of pending job entries per job ring that can be pending processing by the plurality of processors; and a number of job entries per job ring that can be awaiting completion at the order manager.

8. The system of claim 1, wherein each job ring of the plurality of job rings is implemented as a circular buffer, and wherein the job assigner further to select the first job entry and the second job entry sequentially from a head of the originating job ring.

9. The system of claim 1, wherein the job assigner further to track, for each job ring of the plurality of job rings, a number of job entries from the job ring that are currently being processed by the plurality of processors.

10. The system of claim 2, wherein to identify the set of job rings is further based on the tracked number of job entries for each job ring.

11. A method implemented by at least one processing device of a job assigner and an order manager, the method comprising:

receiving, using the at least one processing device, by the job assigner communicably coupled to a plurality of processors, availability status from a plurality of job rings, availability status from the plurality of processors, and job entry completion status from the order manager;

identifying, using the at least one processing device and based on the job entry completion status, a set of job rings from the plurality of job rings that do not exceed threshold conditions maintained by the job assigner;

selecting, using the at least one processing device and from the identified set of job rings, a job ring from which to pull a job entry for assignment for respective job entries of a job, wherein the selecting is based on the availability status of the plurality of job rings;

selecting, using the at least one processing device and based on the received availability status of the plurality of processors, a processor from the plurality of processors to receive the assignment of each respective job entry for processing;

marking, using the at least one processing device, the job entries as complete when the job entries are executed in a correct response order; and delaying, using the at least one processing device, writing a result of a first job entry of the job entries back to an originating job ring when a second job entry of the job entries has not yet been completed and the first job entry is to be written back to the originating job ring after a result of the second job entry according to the correct response order.

12. The method of claim 11, wherein each of the job rings tracks tasks corresponding to a thread of an originating processing device.

13. The method of claim 11, further comprising receiving, from the order manager, a job entry completion status update that indicates the first job entry withheld at the order manager, wherein the first job entry is withheld by the order manager when, subsequent to processing of the first job entry at the selected processor, an order identifier (ID) of the first job entry does not match a current order ID completion number of the originating job ring.

14. The method of claim 11, further comprising receiving, from the order manager, a job entry completion status update that indicates the second job entry is complete, wherein the second job entry is indicated as complete by the order manager when, subsequent to processing of the second job entry at the selected processor, an order identifier (ID) of the second job entry matches a current order ID completion number of the originating job ring.

15. The method of claim 11, wherein the threshold conditions comprise:
a number of pending job entries per job ring that can be pending processing by the plurality of processors; and
a number of job entries per job ring that can be awaiting completion at the order manager.

16. The method of claim 11, further comprising tracking, for each job ring of the plurality of job rings, a number of job entries from the job ring that are currently being processed by the plurality of processors.

17. The method of claim 16, wherein identifying the set of job rings is further based on the number of job entries tracked for each respective job ring.

18. An apparatus comprising:
a plurality of registers to store availability status from each of a plurality of job rings, availability status from each of a plurality of processors, and job entry completion status from an order manager;
at least one processing device to execute a job assigner and an order manager, the job assigner communicatively coupled to the plurality of job rings and the order manager communicatively coupled to the plurality of processors, wherein, for respective job entries of a job, the at least one processing device to:
select, responsive to both the received availability statuses and the job entry completion status, a processor of the plurality of processors to receive the assignment of a job entry from one of the plurality of job rings for processing;
mark the job corresponding to the job entries as complete when the job entries are executed in a correct response order; and
delay writing a result of a first job entry of the job entries back to an originating job ring when a second job entry of the job entries has not yet been completed and the first job entry is to be written back to the originating job ring after a result of the second job entry according to the correct response order.

19. The apparatus of claim 18, wherein each of the plurality of job rings tracks tasks corresponding to a thread of an originating processing device.

20. The apparatus of claim 18, wherein the order manager to:
receive an order identifier (ID) of the first job entry when the selected processor completes processing of the job entry;
determine the job ring from which the first job entry originated;
determine a current order ID completion number associated with the determined job ring;
when the current order ID completion number equals the received order ID of the job entry, complete processing of the first job entry; and
when the current order ID completion number does not equal the received order ID, withhold the first job entry from completion until the current order ID completion number does equal the received order ID.

21. The apparatus of claim 20, wherein withholding the first job entry from completion further comprises the order manager to:
place a completion message for the first job entry and the received order ID in a queue; and
send a job entry completion status update to the job assigner that informs the job assigner that the first job entry is awaiting completion at the order manager.

22. The apparatus of claim 20, wherein the order manager further to:
write a completion message for the first job entry to a response ring of the job ring originating the first job entry; and
send a job entry completion status update to the job assigner that informs the job assigner that processing of the first job entry is completed.

23. The apparatus of claim 18, wherein the registers are further to store a threshold for number of job entries pending and a threshold for number of job entries withheld from completion, further comprising a thresholding component communicably coupled to the plurality of registers, the thresholding component to:
determine a number of job entries currently processing from each of the plurality of job rings;
determine a number of job entries currently withheld from completion from each of the plurality of job rings; and
identify a set of job rings from the plurality of job rings that do not exceed either of the threshold for number of job entries pending or the threshold for number of job entries withheld from completion.

24. The apparatus of claim 18, wherein each job ring of the plurality of job rings is implemented as a circular buffer, and wherein the job assigner further to select the second job entry from a head of the selected job ring.

25. The apparatus of claim 23, wherein the thresholding component further to track, for each job ring of the plurality of job rings, a number of job entries from the job ring that are currently being processed by the plurality of processors.

26. The apparatus of claim 23, wherein the threshold for number of job entries comprises a number of pending job entries per job ring that are pending processing by the plurality of processors; and the threshold for number of job entries withheld from completion comprises a number of job entries per job ring that are awaiting completion at the order manager.

* * * * *